June 12, 1956   M. MAUL   2,749,986
MACHINE FOR OPERATING UPON PERFORATED RECORD CARDS
Filed July 25, 1951   8 Sheets-Sheet 1

Inventor:
Michael Maul

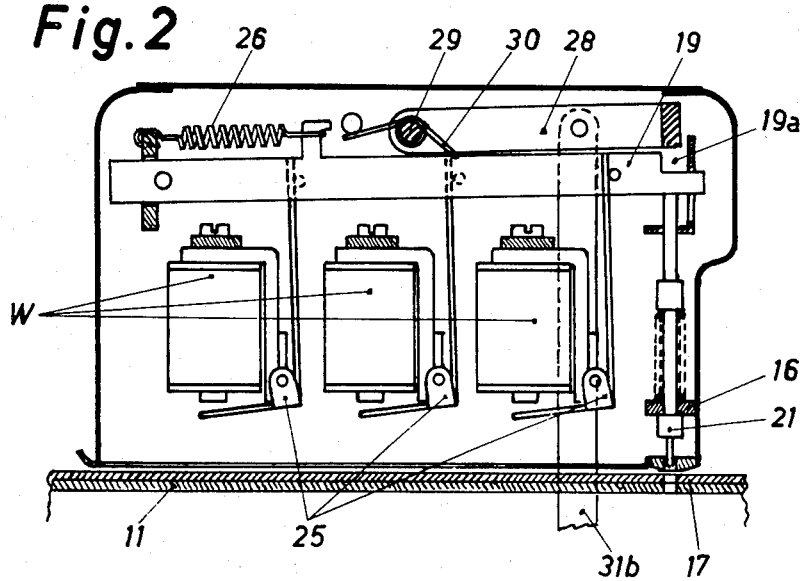
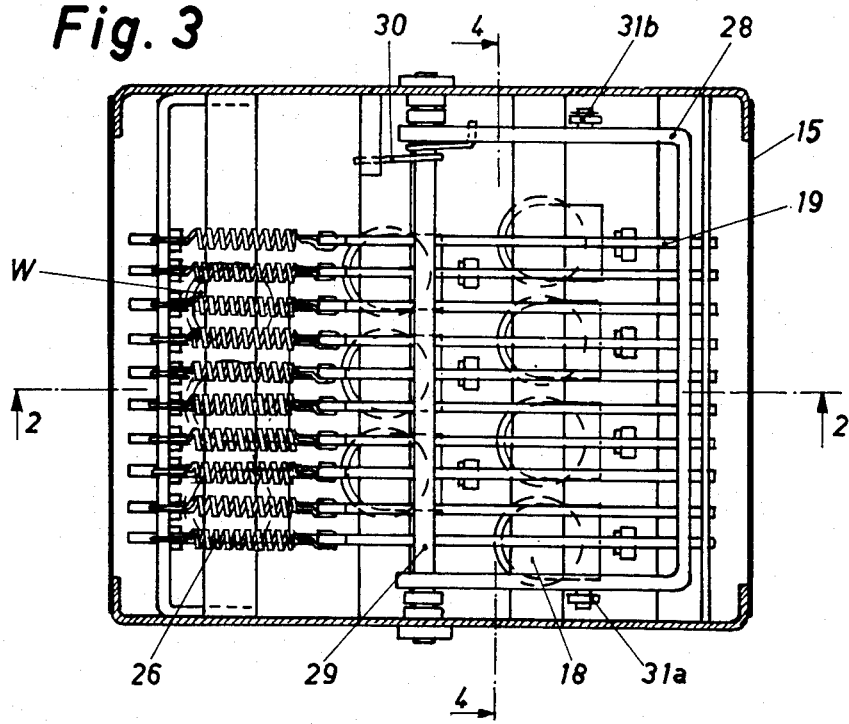

June 12, 1956 M. MAUL 2,749,986
MACHINE FOR OPERATING UPON PERFORATED RECORD CARDS
Filed July 25, 1951 8 Sheets-Sheet 3

Inventor:
Michael Maul

June 12, 1956  M. MAUL  2,749,986
MACHINE FOR OPERATING UPON PERFORATED RECORD CARDS
Filed July 25, 1951  8 Sheets-Sheet 4

Inventor:
Michael Maul

Inventor:
Michael Maul

June 12, 1956  M. MAUL  2,749,986
MACHINE FOR OPERATING UPON PERFORATED RECORD CARDS
Filed July 25, 1951  8 Sheets-Sheet 6

Inventor:
Michael Maul

June 12, 1956  M. MAUL  2,749,986
MACHINE FOR OPERATING UPON PERFORATED RECORD CARDS
Filed July 25, 1951  8 Sheets-Sheet 7

Inventor:
Michael Maul

June 12, 1956  M. MAUL  2,749,986
MACHINE FOR OPERATING UPON PERFORATED RECORD CARDS
Filed July 25, 1951  8 Sheets-Sheet 8

Inventor:
Michael Maul

United States Patent Office 2,749,986
Patented June 12, 1956

2,749,986

MACHINE FOR OPERATING UPON PERFORATED RECORD CARDS

Michael Maul, Schwabach, near Nurnberg, Germany

Application July 25, 1951, Serial No. 238,434

Claims priority, application Germany December 29, 1950

3 Claims. (Cl. 164—113)

In perforated record card systems key-actuated machines are employed for the punching of record cards in which the cards are moved relatively to the punches, column by column, as the keys are actuated.

Now, with such cards, it is most desirable that by key actuation the perforations can be effected in the same columns as those from which the respective written characters are read. In most key actuated punching machines now in use having a column by column relative movement between the card and the column of punches, this aim is however not attainable. This is due to the fact, that the set of punches or, where the card is perforated from the back, the matrix bar, covers just the column to be perforated and in most instances above the card bed there is also provided a housing for selector magnets and key board which covers a large part of the whole record card. Therefore usually the symbols are punched in quite another column than that in which the written or printed characters are located.

Now, however, special punching machines have already been suggested wherein the character associated with a column can be read and upon corresponding key actuation punching takes place immediately in the very same column. Such machines, however, are subject to restrictions in various respects. In the machine according to U. S. Patent 2,210,552 visibility is obtained by extending the set of punches from the upper edge of the card over the record column leaving only the space below the record column visible. In the machine according to the German Patent 547,676 punching is effected from the rear of the card and the matrix extends on the front side of the card over the same from the lower edge only so close to the card head that the space above the record columns remains visible. Accordingly, in these known devices it is impossible to place the characters at will above or below the column or within the hole position as would be frequently necessary for a better differentiation of the characters from each other.

In contradistinction to the above the present invention provides a key actuated machine of the above mentioned type in which the written characters may be placed at will above or below the column or, if desired, between the individual hole positions of a column. An even greater advantage consists in that the invention may be applied to multi-deck cards of any desired kind.

The result according to the invention is attained in that, on key actuation, the column which is in the reading position is automatically moved under the punches, and after the punches have operated on the column, the latter, by reversal of the movement, is automatically moved back far enough for the next column to reach the reading position.

In this way the hand-written or typewritten entries belonging to a column can be read in the reading position, although the same column, while being punched is invisible beneath the punches, nevertheless, after the column has been punched, the next column arrives automatically at the reading position.

This new reciprocating movement and the punching which occurs at the point of the reversal of movement can be put into practice in many ways, and the constructional example hereinafter described illustrates only a preferred form.

In this constructional form, when a data key is actuated the card carriage escapement mechanism automatically shifts the column which is in the reading position which is to the right of the right hand edge of the punch-casing for right to left movement of the card, there being, preferably, a pointer on the frame to indicate the reading position, into a new position in which it is under the punches, and then automatically shifts it back again to an extent such that the next column reaches the reading position. If the reading position is for example to the right of the punches and if the card is fed column by column from right to left (which is most convenient for continuous reading, and is the case in the example hereinafter described), then the backward movement is of an extent one column less than the extent of the forward movement, whereby the next column reaches the reading position.

If, however, with the same reading position, the card is fed step by step from left to right, then the backward movement must be one step greater than the forward movement.

Similarly if the reading position is to the left of the operating elements, and the card is moved step by step from left to right then the backward movement must be one step less than the forward movement. If, however, the card is fed from right to left, then the backward movement of the carriage must be one step greater than the forward movement.

In the preferred form of the invention described below a column which has been subjected to punching under key control is still visible after back shift, so that the punching can be examined when the next column is in the reading position.

Further features of the preferred construction will appear from the specification and claims.

In the following description the invention is set forth as applied to the present 80-column card of usual form punched according to the single-hole system. It will be apparent, however, that the invention can equally well be applied to combination holes and also to cards having a plurality of superimposed rows of columns (known as decks).

Fig. 2 is a longitudinal section through the top housing of the machine taken on line 2—2 of Fig. 3 and showing the punch selector device.

Fig. 3 is a plan view upon the housing shown in Fig. 2 in section.

Figure 1:
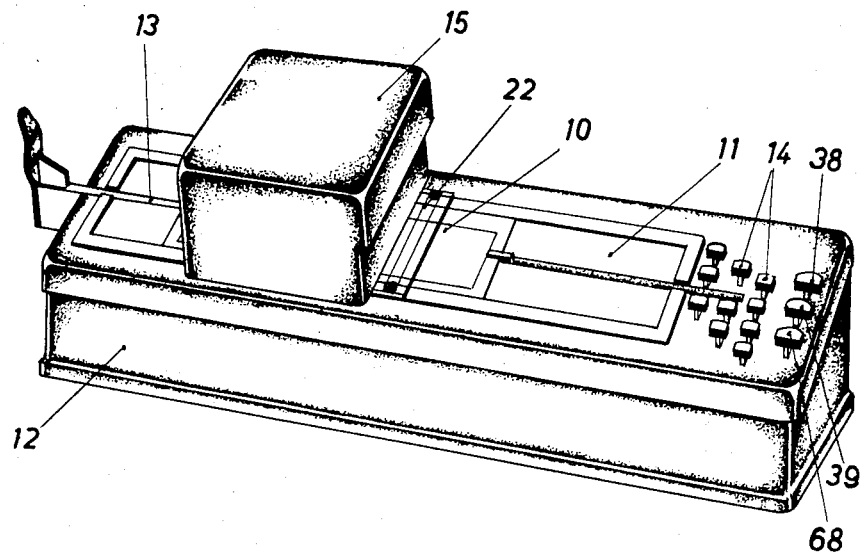
Fig. 1 is a perspective view of the preferred embodiment of the invention.

From the perspective view according to Fig. 1 may be seen that the card 10 is fed in the usual manner in the card bed 11 of the machine casing 12 by the carriage generally indicated at 13. Perforation is caused through the key board 14 also provided in the usual manner. As has been mentioned, the machine is so constructed that an 80 column card according to the single hole system may be punched. Punching is effected through a device provided in the punch housing generally indicated at 15 past which device the card is so shifted that the columns may be punched one by one. In the punch housing there is provided a set of punches generally indicated at 16 (Fig. 2) and beneath the same the associated matrix 17 is arranged in the card bed of the machine. The card is fed between the punches and the matrix. The selection of the punches is effected under key actuation by the selector magnets W provided in the punch housing 15 through selector bars 19 (Figs. 2 and 3). In the present instance the punch housing 15 extends, contrary to the known machines, to the left of the row of punches (Fig. 1) so that the card is visible before it passes back beneath the punches 21. The "reading position" i. e. that position wherein the data of that column may be read that will be punched upon the next key actuation, can be indicated by a mark 22. It is preferably the last column that is to the right of the punch housing so that the operator can just read the character to be punched. The operator can, however, also read the following characters so that it is possible to him to keep several subsequent characters in mind. If the sight mark 22 is so positioned that also the column before said mark can still be read, it is possible to check visually the value just punched.

In addition to the numeral key board 14, other keys are provided that will be described later. One of these is a skip or space key through which the carriage may be shifted step by step without punching operation; further the usual back space key is provided in order to shift the carriage column by column to the right, and further the release key through which the carriage is released from its drive so that it may return under spring action to its left hand end position.

Figure 4:
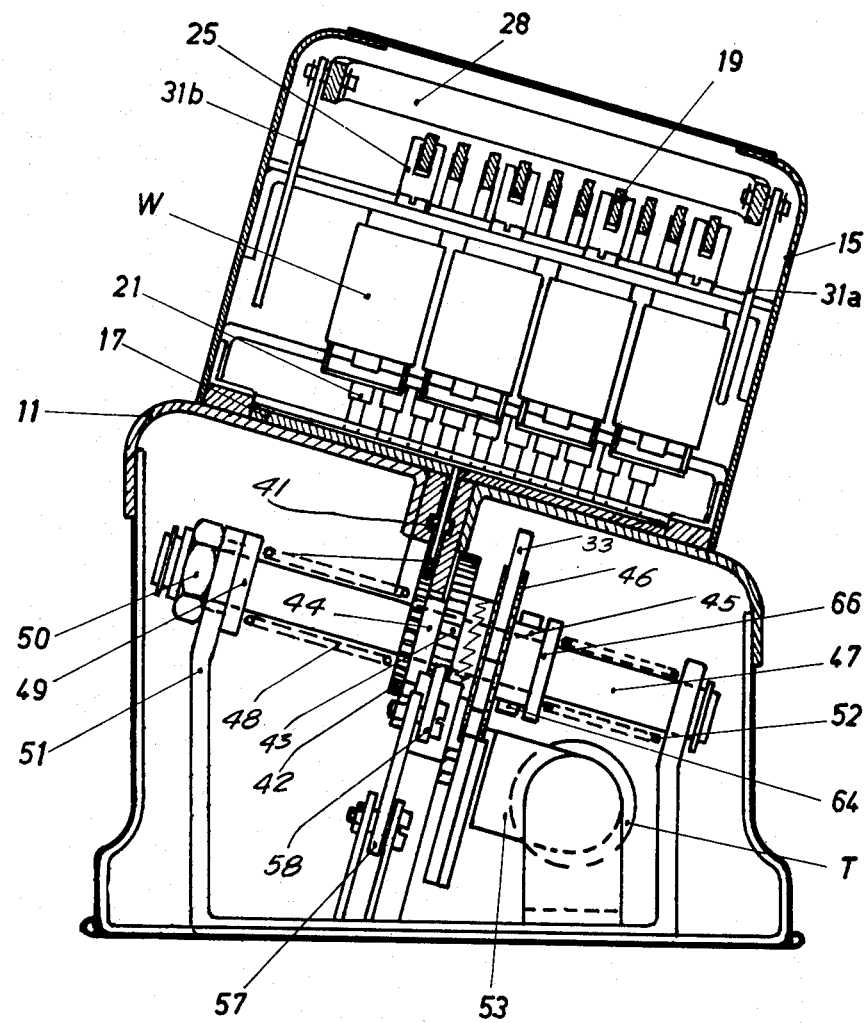
Fig. 4 shows a section through the machine with the punch selector housing said section being taken on line 4—4 of Fig. 3.

The arrangement of the punching device may be seen from Figs. 2, 3 and 4. Upon actuation of a numeral key its associated numeral key contact $z$ will be closed in a manner still to be described. Each contact $z$ (Figs. 5, 8) closes the circuit of an associated selector magnet W (Figs. 2 and 3). Upon energization of the same its armature 25, constructed as a bell crank lever, will be rocked in clockwise direction and will therefore move the associated selector bar 19 to the right against the action of spring 26. The selector bars 19 rest upon the punches 21 which are held in their raised position under spring pressure. Below the set of punches there is the matrix 17. If the card has arrived in punching position the punching yoke 28 (Fig. 2) will be drawn downward through the punch and feed magnet T (Figs. 4, 9, 13, 14) still to be described. The yoke will encounter the upper edge of the shifted selector bars 19 and will press thereby the associated punches through the card. With regard to the selector bars that have not been shifted the punching yoke 28 will remain ineffective, since it will pass in this instance into the recesses 19a of the selector bars and can therefore not engage the selector bars with the punches.

The punching yoke 28 is U-shaped (Fig. 3) and pivotally mounted upon the axis 29. By spring 30 it is held in its home position. The punching yoke is linked to the stirrup 32 (Fig. 9) mounted on the machine casing 11 by means of the axis 40 and the pusher bars 31a, 31b provided on both legs of the yoke 28. The armature 33 of the punch and shift magnet T can hit with its nose 33a the stirrup 32.

Figure 5:
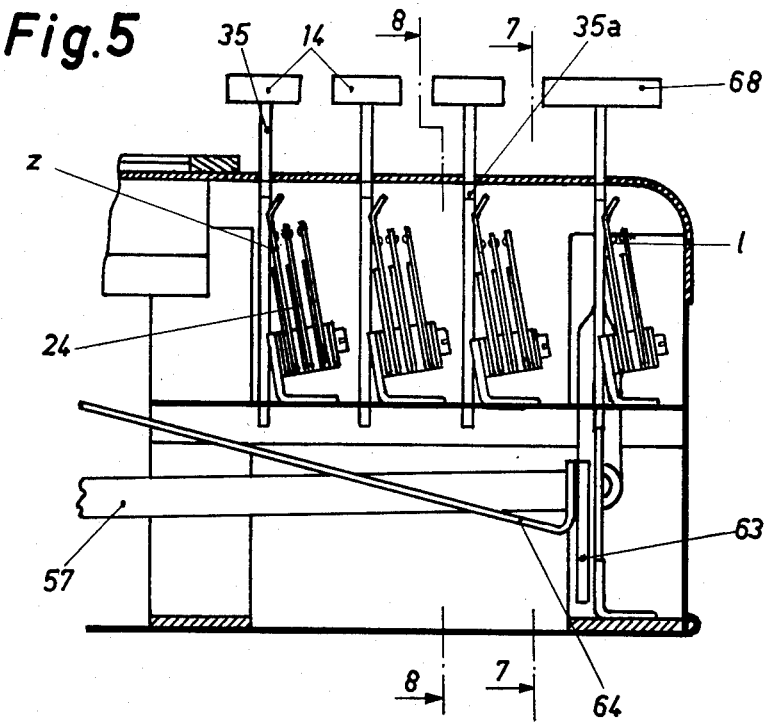
Fig. 5 is a section through the key board from which the arrangement of the key controlled contacts for the selector magnets may be seen.
Figure 6:
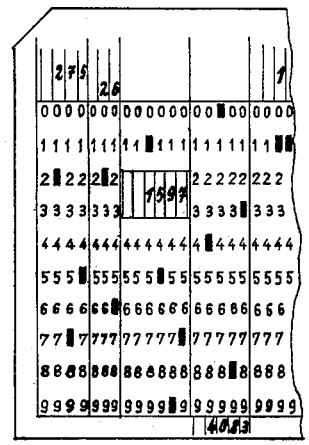
Fig. 6 shows a portion of a card punched in the machine; this portion is divided into various record fields; in each record field the written characters are inscribed at a different level, on the one hand in order to illustrate such possibility and on the other hand because the numbers in the various fields may easier be read and checked for agreement with the punched symbols.
Figure 7:
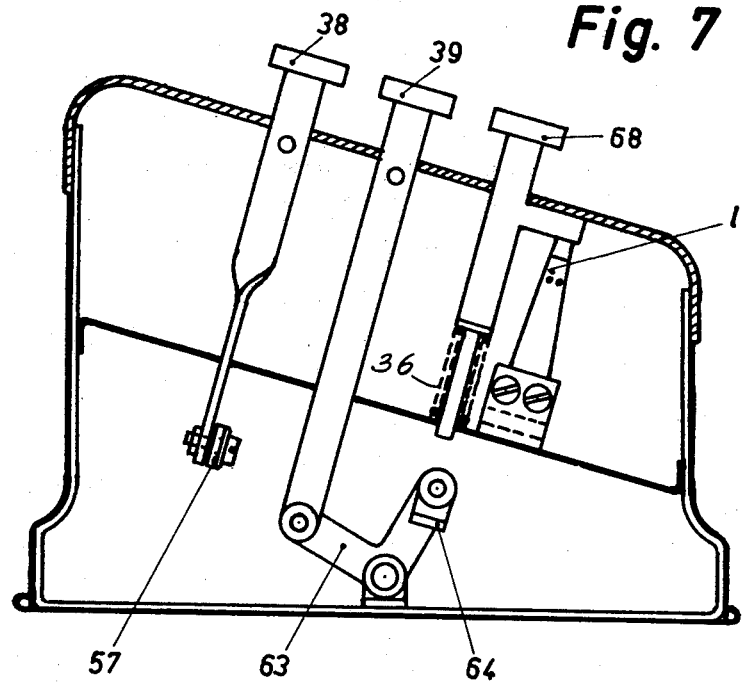
Fig. 7 shows a section through the key board according to line 7—7 of Fig. 5 with the skip or space key, the release key and the back space key.
Figure 8:
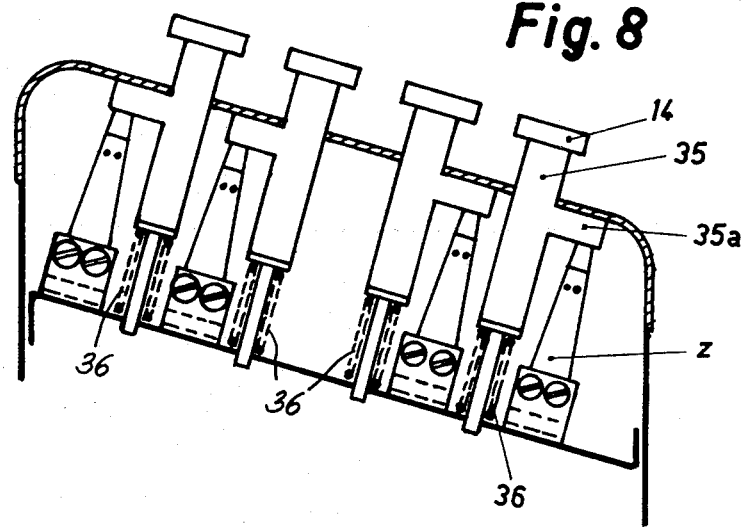
Fig. 8 is a section through the key board according to line 8—8 of Fig. 5 with some numeral keys.
Figure 9:
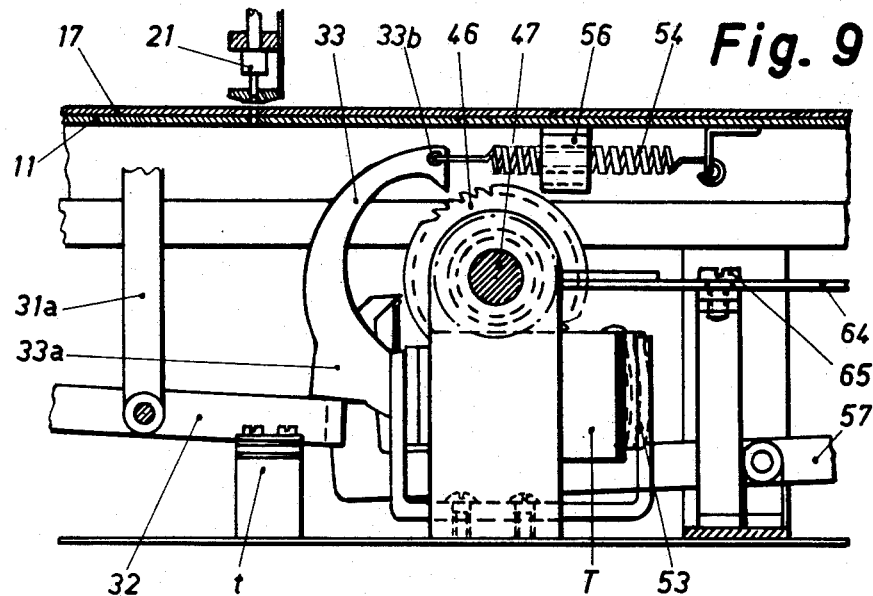
Figs. 9 and 10 show the escapement mechanism for the card carriage in front and top view.

The arrangement of the key board may be seen from the Figs. 5, 7 and 8.

Figure 16:
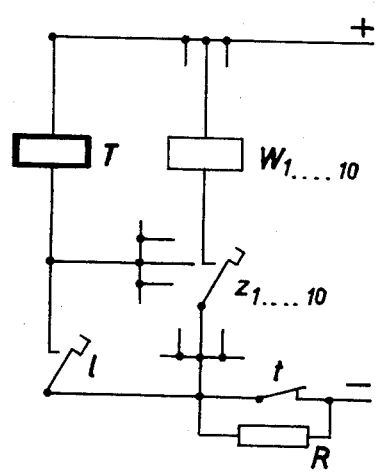
Fig. 16 shows the wiring diagram of the machine.

Each numeral key 14 has a key shaft 35 provided with a sideward extending projection 35a (Fig. 8). In the rest position the key shaft 35 is held upward under the pressure of spring 36, the cover of the key board casing serving as stop. Each numeral key controls a twin operating contact $z$ the contact spots of which are closed one by one upon depression of the key by the projection 35a of the shaft. The first contact spot is associated to the selector magnet W corresponding to the key (see Fig. 16) while the second contact spots of all keys close the current circuit to the punch or feed magnet T respectively. Therefore, at first the selector magnet will be energized and due to the later closure of the second contact, afterwards the punch magnet will be energized that will automatically move the card before punching from the "reading position" into "punch position." After punching the card is again automatically moved from "punch position" into "reading position."

The operation of the back space key 38 and of the release key 39 will be explained in connection with the escapement mechanism of the machine now to be described.

In the described embodiment it has been assumed that the card is in "reading position" five columns to the right of the punch position. Due to the escapement mechanism, the card will now be fed upon key actuation at first for five columns to the left so that the record column having been in reading position before will be moved under the punches. After perforation the card is again shifted back, however for four columns only so that now the next record column will come into reading position.

*Escapement mechanism*

Figure 10:
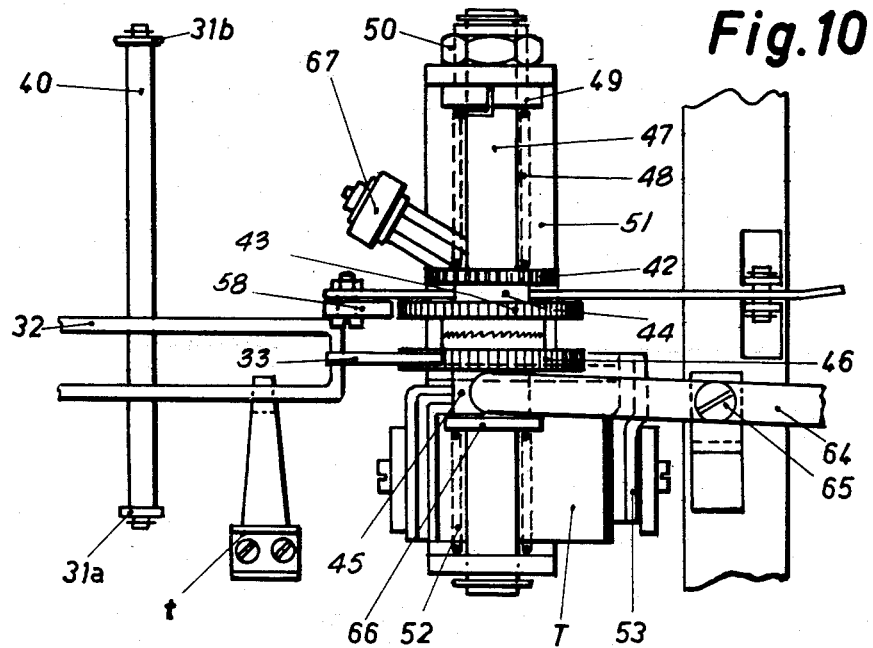

The carriage 13 is guided in the bed 11 by pins 41 (Fig. 4). The carriage is constructed in its lower part as a rack into which the pinion 42 engages. The pinion 42 is fastened together with the ratchet wheel 43 for the back space key to the sleeve 44 (Fig. 10). In the face teeth of sleeve 44, engage the face teeth of sleeve 45 carrying rigidly the locking wheel 46. Both sleeves are loosely rotatable upon the axis 47. Movement of the sleeve 44 is prevented by engagement of the bed between gear 42 and ratchet wheel 43 (Fig. 4). The feeding power for the carriage is derived from spring 48 fastened to gear 42 and sleeve 49. Sleeve 49 is loosely rotatable upon the frame 51 and is fastened by a screw nut 50. This provision has been made in order to permit tensioning of spring 48. If the screw nut 50 is loosened the sleeve 49 may be rotated and this in turn will tension the spring 48. The sleeve 45 is pressed by spring 52 against sleeve 44 so that normally the face teeth are in engagement. The axis 47 is mounted in the frame 51.

Figure 14:
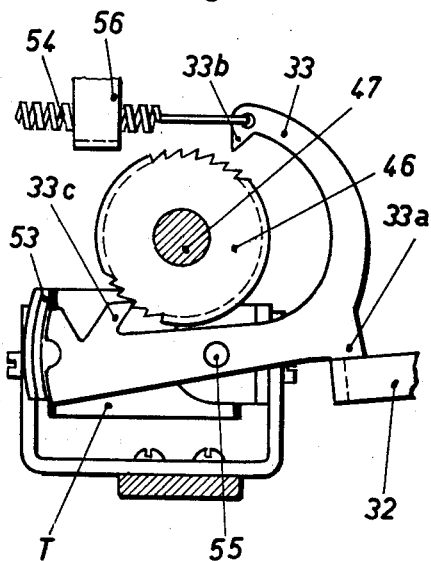

The step by step movement is effected by the electromagnet T (Figs. 9, 10, 13, 14) through escapement 33 serving also as a locking anchor. Escapement 33 is rotatably mounted by bolt 55 on the eye 53b of the yoke. The particular step by step movement requires a large step. Therefore a magnet with a rocking armature has been provided. The escapement 33 is held in its rest position (Fig. 13) by spring 54. The spring 54 must be considerably stronger than the feed spring 48 since the spring 54 must return the carriage against the action of feed spring 48. If the magnet T is energized it will attract its armature 33 thereby rocking the latter. The tooth 33b of the armature 33 will travel during this movement to the right (Fig. 14) and the locking wheel 46 will follow under the influence of feed spring 48. After a certain rocking movement the tooth 33c will engage the locking wheel and will prevent further movement. In the same moment in which the tooth 33c assumes the locking action, the nose 33a of the armature will encounter the stirrup 32 which in turn will move the punching yoke 28 over the pusher bars 31a and 31b (Figs. 2 and 3) until the tooth 33c will reach the bottom of the tooth of the locking wheel. Through yoke 28 and selector bars 19 (Fig. 2) the punches 21 will then be pressed through the card. At the same time the stirrup 32 (Figs. 9 and 10) will open the contact t which will be referred to later on in the description of the wiring diagram. The position of the tooth 33c is so chosen that the same drops radially into the locking wheel 46 (Fig. 14). Thereby it will be obtained that the position of the card upon punching is accurately determined independently thereof whether the tooth 33c has already reached the bottom of the tooth of the locking wheel 46 or not. If the current is interrupted, the armature 33 will drop and the spring 54 will draw the tooth 33b to the left (Figs. 13, 14); during this movement the latter assumes again the rocking action while the tooth 33c will be withdrawn from the locking wheel. The locking wheel is moved by the tooth 33b up to the fixed stop 56 (see also Fig. 9) against the action of the feed spring, the carriage 13 being moved thereby to the right by gear 42 (Fig. 4). The stop 56 is so adjusted that the column to be punched will move under the index mark 22 (Fig. 1).

If the back space key 38 (Fig. 7) is actuated, the same will move the lever 57 downward about the bolt 60. At the left end of the lever 57 (Fig. 12) the pawl 58 is rockably mounted, said pawl moving upwardly therewith and sliding under the action of spring 49 from the stop plate 61 into the ratchet wheel 43 thereby moving the same. By means of the inclined rear faces of the face teeth, the sleeve 45 is hereby pressed outward against spring 52 (Figs. 4, 10) which after rotation of the ratchet wheel for one step will again engage into the sleeve 45. Thereby the carriage 13 has been moved for one step to the right (Figs. 1, 11) through gear 42. The spring 62 (Fig. 12) will restore the pawl 58, the lever 57 and the back space key 38 to their home position and during this movement the stop plate 61 will disengage the pawl 58 from the ratchet wheel. By slight bending the stop plate may be so adjusted that the pawl will correctly drop into the ratchet wheel. Thus it will be seen that the back space key 38 controls only back shifting of the carriage for one column in the usual manner without causing the reciprocating movement of the carriage caused by depression of a data key.

Figure 11:
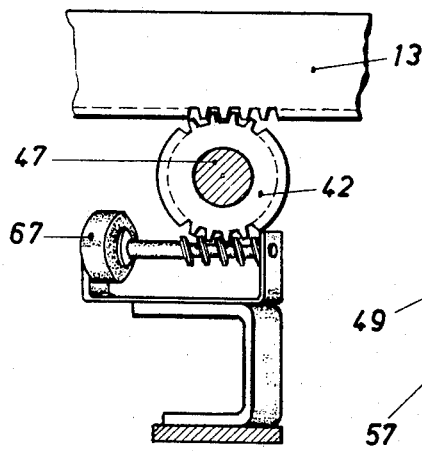
Fig. 11 shows the engagement of the driving pinion into the rack of the card carriage as well as the velocity brake that prevents too fast a return of the card carriage.
Figure 12:
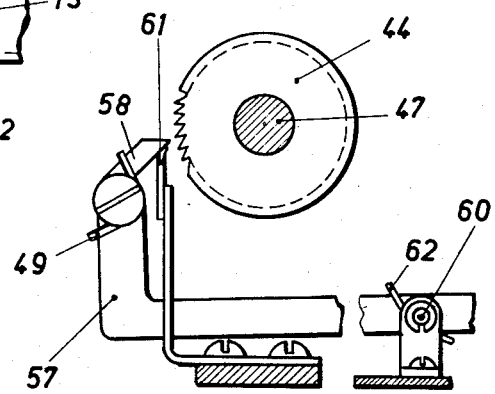
Fig. 12 shows the construction of the feed pawl for the back feed of the card carriage, said pawl being actuated by the back space key through a lever mechanism.
Figure 13:
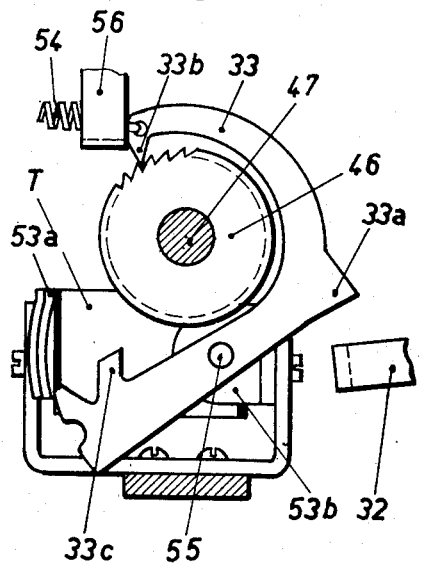
Figs. 13 and 14 show the escapement mechanism and particularly the escapement armature in the released and attracted position.
Figure 15:
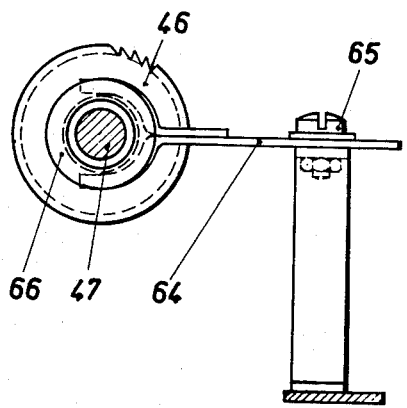
Fig. 15 shows the disengaging fork which is actuated by the release key through a lever mechanism.

If the release key 39 (Figs. 5, 7) is actuated it will rock the lever 64 about bolt 65 through bell crank lever 63 (Fig. 15). The lever 64 is forked at its left hand end and embraces the sleeve 45 between the locking wheel 46 (Figs. 4 and 10) and the ring 66, the latter being also rigidly fastened upon the sleeve 45. The lever 64 will move the sleeve 45 outward against spring 52 whereby sleeve 45 will be disengaged from sleeve 44. The sleeve 44 will be released together with the gear 42 so that the feed spring 48 can relax. The carriage 13 will thereby be moved through the gear 42 to the left (Figs. 1, 11). In order to avoid too great a velocity of the carriage a centrifugal brake 67 of the known type is driven by gear 42 through a worm.

The skip key 68 (Figs. 5, 7) is provided like a regular key with the only difference that it has an operating contact 1 for the escapement mechanism.

*Wiring generally*

In the illustration of the wiring for the punching machine a simplified method has been chosen as it is generally in use in the art of electrical communication technique. If several similar units are provided such as selector magnets and key contacts, only one of them is shown in the diagram while the remainder is indicated by the distribution connections only. The number of the units is determined by the Arabic figure in the index. The relays and magnets are designated with capitals and the contacts actuated by them with the corresponding small letters. Manually actuated contacts are characterized by a hook on the upper end of the movable contact member. Generally, the designation for the magnets, relays, and contacts is provided in such way that the characters are to the right or above the wiring symbol. Shift magnets, punching magnets and other strong magnets are characterized by a stronger outline.

*Wiring diagram for the punching machine*

If a data key is depressed the same will close the twin operating contact z, establishing a current circuit through the selector magnet W. Current will flow from plus through the selector magnet W through contacts z and t to minus. Shortly after closure of the first contact spot of the contact z, the second contact spot will be closed, establishing a current circuit through the feed magnet T. Current will flow from plus through the feed magnet T and contacts z and t to minus. The feed magnet T will be energized and will open its contact t. Now, the current of both circuits (selector magnet and feed magnet) will flow no longer over contact t, but over the protection resistance R. The protection resistance has been provided so that upon longer depression of the key the high initial current will not always flow through the coils of the magnets. If the contact t and the protection resistance R were not provided the high initial current would flow through the magnets as long as the data key is depressed which could easily result in too high a temperature of the coils, thus destroying the same. If the data key returns to its home position, both contact spots of contact z will again be separated and both current circuits will be interrupted so that the selector and the feed magnet may drop. If the skip key 68 is depressed it will close its operating contact 1 thereby energizing magnet T and causing a skip movement of the card carriage for one column without any reciprocating movement of the carriage.

What I claim is:

1. In a key actuated record card punching machine, the combination of a set of actuating keys, a single column of punches operable under the control of said keys, card feeding means for holding a card such that the column to be punched is free from visual obstruction by the punches and is in a predetermined sight position, and means operable upon depression of any one of said keys to actuate said card feeding means to feed a card a predetermined distance in relation to said punches to position the stated card column to be punched in alignment with the punches and then to feed the card backwardly by a predetermined shorter distance to place the next card column to be punched in the predetermined sight position.

2. In a key actuated record card punching machine, the combination of a set of actuating keys, a single column of punches under the control of said keys, an escapement mechanism, a card carriage movable under the control of said escapement mechanism and normally positioned to hold a card such that the card column to be punched is free from visual obstruction by the punches and is in a predetermined sight position, and means whereby actuation of any one of said keys actuates said escapement mechanism to move said card carriage a predetermined distance in one direction in relation to said punches to position the stated card column to be punched in alignment therewith and then in the opposite direction by a different predetermined distance to place the next card column to be punched in the predetermined sight position.

3. In a key actuated record card punching machine the combination of a group of actuating keys, a single column of punches, means whereby actuation of any key of said group selects for operation the corresponding punch, card feeding means for holding a card such that the column to be punched is free from visual obstruction by the punches and is in a predetermined sight position, an escapement mechanism operable on depression of any one of said group of keys to actuate said card feeding means to feed a card a predetermined distance in relation to said punches to position the stated card column to be punched in alignment with the punches and then to feed said card backwardly a different predetermined distance to place the next card column to be punched in the predetermined sight position, and punch actuating means operable by said escapement mechanism, to actuate a selected punch on completion of the first mentioned card feed.

References Cited in the file of this patent

UNITED STATES PATENTS

| | | |
|---|---|---|
| 1,195,605 | Powers | Aug. 22, 1916 |
| 1,657,696 | Robertson | Jan. 31, 1928 |
| 1,818,338 | Kropff | Aug. 11, 1931 |
| 1,856,737 | Thomas | May 3, 1932 |
| 2,168,434 | Von Pein | Aug. 8, 1939 |
| 2,210,552 | Maul | Aug. 6, 1940 |
| 2,279,161 | D'Humy | Apr. 7, 1942 |
| 2,315,741 | Shafer | Apr. 6, 1943 |
| 2,444,564 | Goodbar et al. | July 6, 1948 |
| 2,547,456 | Gardinor | Apr. 3, 1951 |

FOREIGN PATENTS

| | | |
|---|---|---|
| 125,360 | Austria | Nov. 10, 1931 |